US006868120B2

United States Patent
Gormley et al.

(10) Patent No.: US 6,868,120 B2
(45) Date of Patent: Mar. 15, 2005

(54) REAL-TIME SYSTEM FOR MEASURING THE RICEAN K-FACTOR

(75) Inventors: Eamonn Gormley, Seattle, WA (US); Jose Rodriguez-Sanchez, Seattle, WA (US)

(73) Assignee: Clearwire Corporation, Kirkland, WA (US)

(*) Notice: Subject to any disclaimer, the term of this patent is extended or adjusted under 35 U.S.C. 154(b) by 790 days.

(21) Appl. No.: 09/777,783

(22) Filed: Feb. 6, 2001

(65) Prior Publication Data

US 2002/0027951 A1 Mar. 7, 2002

Related U.S. Application Data

(60) Provisional application No. 60/180,928, filed on Feb. 8, 2000.

(51) Int. Cl.[7] .............................................. H04B 17/00
(52) U.S. Cl. ..................... 375/224; 375/225; 375/355
(58) Field of Search ............................... 375/224, 316, 375/355; 379/59; 455/524, 504, 436, 133–135, 423

(56) References Cited

U.S. PATENT DOCUMENTS

| | | | |
|---|---|---|---|
| 3,937,945 A | | 2/1976 | Fitzmaurice et al. |
| 4,089,462 A | | 5/1978 | Bradford |
| 5,774,814 A | | 6/1998 | Haas |
| 6,304,594 B1 | * | 10/2001 | Salinger ..................... 375/222 |
| 6,320,919 B1 | * | 11/2001 | Khayrallah et al. ......... 375/347 |
| 6,359,938 B1 | * | 3/2002 | Keevill et al. .............. 375/316 |
| 6,690,746 B1 | * | 2/2004 | Sills et al. .................. 375/316 |

OTHER PUBLICATIONS

Greenstein L.J. et al. "Moment–method estimation of the Ricean K–factor", Communications Letters, IEEE, vol. 3, issue 6, Jun. 1999, pp. 175–176.*

IEEE Communications Letters, "Moment–Method Estimation of the Ricean K–Factor", Greenstein et al, Published Jun. 1999 (vol. 3, No. 6).

Selected Webpages from www.mprg.ee.vt.edu/research/glomo.

(List continued on next page.)

Primary Examiner—Temesghen Ghebretinsae
Assistant Examiner—Qutub Ghulamali
(74) Attorney, Agent, or Firm—Michael J. Donohue; Davis Wright Tremaine LLP

(57) ABSTRACT

A system and method for measuring the Ricean K-factor of a wireless channel in real time are provided. An amplitude sample of a transmitted RE waveform of either fixed or varying amplitude is low-pass filtered to eliminate high frequency noise if present. The magnitude squared of the filtered sample amplitude is squared to obtain the power gain of the sample and the magnitude squared of the power gain is computed. The sums of a window of power gains and the sum of the squares of the power gains are then updated. These sums of the window of amplitude samples are then averaged to estimate the first and second moments of the window of samples. The averages are low-pass filtered to minimize fluctuations. The final average is input to a moment-based set of Greenstein-Michelson-Erceg (GME) equations to obtain estimates for the time average of the power gain and rms deviation of the power gain. The K-factor is calculated in accordance with these equations and low-pass filtered to smooth the result.

6 Claims, 3 Drawing Sheets

OTHER PUBLICATIONS

Selected Webpages from www.ednmag.com/ednmag/reg/1998/091198, "RF–channel simulators bring reality's challenges to your prototype", Bill Schweber, Technical Editor; EDN Access, Sep. 11, 1998.

Schweber, "RF–channel simulators bring reality's challenges to your prototype," EDN Access (Sep. 11, 1998).

Greenstein et al., "Moment–Method Estimation of the Ricean K–Factor," IEEE Communications Letters 3:175–176 (Jun. 1999).

On Fading, Parameters of the Mobile Radio Channel, Types of Fading, Models for Small–Scale Propagation Phenomena, Measurements of Small–Scale Propagation Phenomena, Impact of Antenna Gain and Fading, accessed on the Internet Feb. 25, 2000.

J.D. Parsons, *The Mobile Radio Propagation Channel*, New York: Wiley, 1992, pp. 134–136.

R. Steele, *Mobile Radio Communications*, IEEE Press, 1995, pp. 167–173.

Bendat et al., *Random Data: Analysis and Measurement Procedures*, New York: Wiley, 1986, pp. 74–85.

S.M. Kay, *Fundamentals of Statistical Signal Processing: Estimation Theory*, Prentice Hall, 1993, pp. 102–116.

Michelson et al., "Modeling Diversity Reception Over Narrowband Fixed Wireless Channels," IEEE MTT–S Int. Topical Symposium Tech. Wireless Applic., p. 95–100 (Feb. 1999).

Ndzi et al., "Hyper–Resolution Indoor Channel Impulse Responses: Multipath Components and k–Factors," Electronics Letters 35:698–699 (Apr. 29, 1999).

Bohdanowicz et al., "Wideband Indoor and Outdoor Multipath Channel Measurements at 17 GHz," IEEE Vehicular Tech. Conf. Amsterdam, p. 1998–2003 (Sep. 1999).

van der Wijk et al., "Assessment of a Pico–Cellular System Using Propagation Measurements at 1.9 GHz for Indoor Wireless Communications," IEEE Transactions on Vehicular Technology 44:155–162 (Feb. 1995).

G. Söder "Modellierung Simulation und Optimierung von Nachrichtensystemen", p. 68–69 (1993). International Search Report, Patent Cooperation Treaty Application PCT/US01/03854.

International Search Report, Patent Cooperation Treaty Application PCT/US01/03854.

* cited by examiner

REAL-TIME SYSTEM FOR MEASURING THE RICEAN K-FACTOR

This application claims priority to Provisional Application Serial No. 60/180,928, filed on Feb. 8, 2000.

BACKGROUND

The present invention relates generally to wireless communications, and more particularly, to a system for measuring the Ricean stastical nature of radio propagation in real time.

A channel having two fundamental components comprised of a fixed component and a fluctuating multipath component (i.e., the addition of several scattered versions of the original beam), can be characterized as having a propagation environment that is Ricean in statistical nature. The K-factor of a Ricean channel is the ratio of the power received in the fixed component, to the total power received via indirect scattered paths. Knowledge of the Ricean K-factor is important in the understanding of fixed and other wireless channels. It is a statistical computation that helps to implement link budget calculations by allowing estimates of fast fading margins, i.e., it enables the description of the fast fading envelope's distribution. It also provides useful information to provide efficient power control. Field technicians can use K-factor readings to estimate the condition of the channel, and to determine the bit error rate of the channel. Accordingly, the ability to implement timely and accurate measurements of the K-factor is a highly desirable characteristic in a wireless communication system. Measurements of the K-factor have traditionally been made by way of a network analyzer that compares transmitted and received waveforms. An example of which is disclosed in J. P. M. G. Linnartz (Ed.), *How to measure the Ricean K-factor, in Wireless Communication, The Interactive Multimedia CD-ROM*, Edition 1999, Baltzer Science Publishers, Amsterdam, 1999. Using a network analyzer for this application has drawbacks including high cost and impractical implementation. Network analyzers are typically bulky devices that cannot be embedded into a system. Moreover, measurements obtained in this manner cannot be used to perform real-time tasks as the process is more akin to a "laboratory testing" environment.

SUMMARY OF THE INVENTION

In accordance with the present invention, it is an object thereof to provide a system for measuring the K-factor of a Ricean channel in real time.

It is further object of the present invention to provide a system for measuring the K-factor of a Ricean channel to improve wireless transmission efficiency.

It is another object of the present invention to provide a system for measuring the K-factor of a Ricean channel using a moment-estimation method.

It is yet another object of the present invention to employ a minimum sufficient statistics estimation in combination with selective filtering of the estimation to measure the K-factor of a Ricean channel.

It is another object of the present invention to provide a system for measuring the K-factor of a Ricean channel which advantageously reduces the margin of fluctuations in the estimation of the K-factor, avoids system overflows, reduces data buffering requirements, reduces the quantity of operations per filter, and provides quick convergence of the reported K-factor to the actual value.

In accordance with the above objects and additional objects that will become apparent hereinafter, the present invention provides a system and method for measuring the Ricean K-factor of a wireless channel in real time. The method generally comprises the following steps. Initially, an amplitude sample of a transmitted RF waveform is low-pass filtered to eliminate high frequency noise if present. The sample can be either of a fixed or varying amplitude. If the sample is of a varying amplitude, it is normalized prior to being applied to the low-pass filter. The magnitude squared of the filtered sample amplitude is then squared to obtain the power gain of the sample and the magnitude squared of the power gain is computed. The sums of a window of power gains and the sum of the squares of the power gains are updated. These sums of the window of amplitude samples are then averaged to estimate the first and second moments of the window of samples. The averages are low-pass filtered to minimize fluctuations. The final average is input to a moment-based set of Greenstein-Michelson-Erceg (GME) equations (described in detail hereinbelow) to obtain estimates for the time average of the power gain and rms deviation of the power gain. The K-factor is calculated in accordance with these equations and low-pass filtering may by applied to smooth the result.

DETAILED DESCRIPTION OF THE PREFERRED EMBODIMENT

Figure 1:
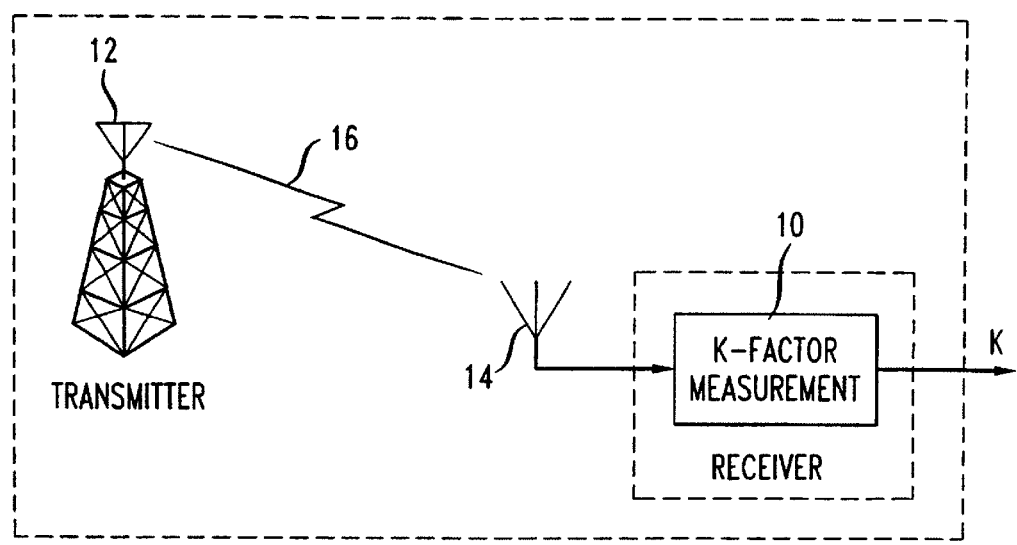
FIG. 1 depicts a general schematic of a system for measuring the Ricean K-factor in accordance with the present invention.

Referring now to FIG. 1, there is depicted a general schematic of an end-to-end real-time system 10 for measuring the Ricean K-factor. The system 10 is part of a wireless communications system including a transmitter 12 and a receiver 14. The transmitter 12 sends a known signal (continuous or time keyed) 16 of a fixed or varying amplitude. The system 10 associated with the receiver 14 processes an amplitude sample of the signal and processes the signal sample to provide an updated K-factor for the channel. This may be done at either fixed or non-fixed time intervals. The K-factor value thus obtained can be displayed or used by other parts of the wireless system, e.g., to effect power control. The details of this procedure are described in greater detail hereinbelow.

Most wireless communication networks have the capability to transmit pilot tones of a known amplitude. In these systems, the receiving portion of the system for measuring the K-factor can be incorporated into the receiving components of the wireless system. Theoretically, a time function representing the complex signal path gain of a narrowband wireless channel can be shown as:

$$g(t) = V + v(t) \qquad \text{(EQ. 1)}.$$

Then, the K-factor can be calculated with the following expression:

$$K = \frac{\sqrt{G_a^2 - G_v^2}}{G_a - \sqrt{G_a^2 - G_v^2}}, \quad (EQ. 2)$$

where:
- g(t) is the frequency-flat response;
- V is a complex constant;
- v(t) is a complex, zero mean random time variation caused by diverse factors such as vehicular motion, wind-blown foliage, etc.;
- $G_a$ is the time average (rms value) of the power gain; and
- $G_v$ is the rms fluctuation of the power gain about Ga.

The details of this derivation are discussed in L. J. Greenstein, D. G. Michelson, and V. Erceg, "Moment-Method Estimation of the Ricean K-Factor," *IEEE Communications Letters*, Vol. 3, No. 6, pp. 175–176, June 1999, the disclosure of which is incorporated by reference as though fully set forth herein.

In real-time systems it is unusual to have true measurements of $G_a$ and $G_v$. Typically, only partial knowledge (i. e., estimates) of these two parameters are known. Accordingly, a real-time system which uses EQ. 1 and EQ. 2 to compute the K-factor must pay special attention to the estimates of $G_a$ and $G_v$.

In deriving the expression for the K-factor (EQ. 2), the power gain of the narrowband wireless channel is defined as:

$$G = |g(t)|^2 = |V + v(t)|^2 \quad (EQ. 3).$$

Expanding, this equation provides:

$$G = \left(((V + v(t))^2)^{\frac{1}{2}}\right)^2. \quad (EQ. 4)$$

And so, $$G = (V + v(t))^2 = (V + v(t)) \cdot (V + v^*(t)) \quad (EQ. 5),$$

where v*(t) is the complex conjugate of v(t).

Furthermore, $$G = V \cdot V + V \cdot v^*(t) + V \cdot v(t) + v(t) \cdot v^*(t) = |V|^2 + V \cdot (v^*(t)) + |v(t)|^2 \quad (EQ. 6).$$

But, $$v^*(t) = v(t) = 2Re\{v^*(t)\} \quad (EQ. 7).$$

Therefore, $$G = |V|^2 + 2Re\{V \cdot v^*(t)\} + |v(t)|^2 \quad (EQ. 8).$$

The time average or true mean of G is represented by:

$$G_a = \bar{G} = \overline{|V|^2 + |v(t)|^2 + 2Re\{V \cdot v^*(t)\}} \quad (EQ. 9), \text{ and}$$

$$G_a = \overline{|V|^2} + \overline{|v(t)|^2} + \overline{2Re\{V \cdot v^*(t)\}} \quad (EQ. 10).$$

However, since the above derivation establishes that v(t) is a zero-mean random process, further simplification yields:

$$G_a = |V|^2 + \overline{|v(t)|^2} \quad (EQ. 11).$$

And, since v(t) represents a zero mean random time variation, its variance is shown by:

$$\sigma^2 = \overline{|v(t)|^2} \quad (EQ. 12).$$

Thus, the final form of the time average (true value) of the power gain is:

$$G_a = |V|^2 + \sigma^2 \quad (EQ. 13).$$

Next, we are interested in obtaining the variance of G. That is, the fluctuation of G about $G_a$. That is, $$G_v^2 = \overline{[(G - G_a)^2]} \quad (EQ. 14).$$

First, we concentrate on the inner part of this equation:

$$(G - G_a)^2 = G^2 - (2 \cdot G \cdot G_a) + G_a^2 \quad (EQ. 15).$$

Substituting EQ. 8 and EQ. 13 in the right hand side of EQ. 18 and simplifying, we obtain:

$$(G - G_a)^2 = |v(t)|^4 + \sigma^4 - (2 \cdot |v(t)|^2 \cdot \sigma^2) + (2Re\{V \cdot v^*(t)\})^2 \quad (EQ. 16).$$

Since EQ. 14 requires the average of EQ. 15, we obtain:

$$\overline{(G - G_a)^2} = \overline{|v(t)|^4} + \sigma^4 - (2 \cdot \overline{|v(t)|^2} \cdot \sigma^2) + \overline{(2Re\{V \cdot v^*(t)\})^2} \quad (EQ. 17).$$

By substituting EQ. 7 in EQ. 17 we have:

$$\overline{(G - G_a)^2} = \overline{|v(t)|^4} + \sigma^4 - (2 \cdot \sigma^4) + \overline{(2Re\{V \cdot v^*(t)\})^2} \quad (EQ. 18).$$

Simplifying, $$G_v^2 = \overline{(G - G_a)^2} = \overline{|v(t)|^4} - \sigma^4 + \overline{(2Re\{V \cdot V^*(t)\})^2} \quad (EQ. 19).$$

Again using the initial assumption that v(t) is a zero-mean complex Gaussian random process, we have:

$$G_v = ([\sigma^4 + 2|V|^2 \sigma^2])^{\frac{1}{2}}. \quad (EQ. 20)$$

Given the definition of g(t) above and based on the initial assumption that v(t) is a zero-mean complex Gaussian process, the power gain G has a Ricean distribution over time. The total power is represented by Ga, and the K-factor is characterized by:

$$K = \frac{|V|^2}{\overline{|v(t)|^2}}. \quad (EQ. 21)$$

EQ. 21 can be expressed using the moments derived above. The power of the fixed component therefore becomes:

$$G_a^2 - G_v^2 = (|V|^2 + \sigma^2)^2 - (\sigma^4 + 2|V|^2 \sigma^2) = |V|^4 \quad (EQ. 22).$$

Accordingly, $$|V|^2 = [G_a^2 - G_v^2]^{\frac{1}{2}}. \quad (EQ. 23)$$

A similar derivation is employed to represent the power of the multipath component. We previously found that:

$$G_a = |V|^2 + \sigma^2, \text{ and}$$

rearranging we have:

$$\sigma^2 = G_a - |V|^2 \quad (EQ. 24).$$

Substituting the second term by its moment-based definition yields:

$$\sigma^2 = G_a - ([G_a^2 - G_v^2])^{\frac{1}{2}}. \quad \text{(EQ. 25)}$$

Therefore, the final expression for the K-factor in terms of the moments of the power gain is:

$$K = \frac{\sqrt{G_a^2 - G_v^2}}{G_a - \sqrt{G_a^2 - G_v^2}}. \quad \text{(EQ. 26)}$$

Accordingly, the first and second moments in EQ. 26 are the true moments of G, i. e., the time average and time variance, respectively. Since we only have statistical values, we must now utilize an efficient real-time algorithm to compute K. Since the time frame for enabling the calculation of the true values of the moments of G is not infinite, these moments are estimated using appropriate estimators.

For complex Gaussian signals, the best estimator of the mean is the sample mean defined as:

$$\bar{x} = \frac{1}{N} \cdot \sum_{i=1}^{N} x_i. \quad \text{(EQ. 27)}$$

For the same complex Gaussian signal, a good estimator of the variance is the sample variance as follows:

$$\sigma_x^2 = \frac{1}{N} \cdot \sum_{i=1}^{N} (x_i - \bar{x})^2. \quad \text{(EQ. 28)}$$

The above expression is intended to be an exemplary estimator of variance. The optimal estimator of the variance averages over N-1 samples instead of over N samples. The formula expressed above is not generally considered to be the best estimator of the variance since it is biased. However, given the size of N the bias is negligible in the context of the present invention. The exemplary estimator is computationally simpler than one that optimally estimates the variance over N-1 samples, and for all practical purposes the bias can be disregarded without any appreciable loss of accuracy (or if desired, the bias may be compensated for).

Next, the minimal sufficient statistics necessary to calculate the first and second moments just defined are calculated. Further explanations on the theory of sufficient statistics can be found in S. M. Kay, *Fundamentals Of Statistical Signal Processing: Estimation Theory*, New Jersey: Prentice Hall, 1993, pp. 102–116, and J. S. Bendat, A. G. Piersol, *Random Data: Analysis and Measurement Procedures*, New York: Wiley, 1986, pp. 74–88, the disclosures of which are incorporated herein by reference.

First, the right hand side of EQ. 28 is expanded as follows:

$$\sigma_x^2 = \frac{1}{N} \cdot \sum_{i+1}^{N} (x_i^2 - 2x_i \cdot \bar{x} + \bar{x}^2). \quad \text{(EQ. 29)}$$

That is, $$\sigma_x^2 = \frac{1}{N} \sum_{i=1}^{N} x_i^2 - 2\bar{x} \frac{1}{N} \sum_{i=1}^{N} x_i + \frac{1}{N} \sum_{i=1}^{N} \bar{x}^2. \quad \text{(EQ. 30)}$$

Substituting the previously defined sample mean yields:

$$\sigma_x^2 = \frac{1}{N} \sum_{i=1}^{N} x_i^2 - 2\bar{x} \cdot \bar{x} + \frac{1}{N} N \bar{x}^2. \quad \text{(EQ. 31)}$$

That is, $$\sigma_x^2 = \frac{1}{N} \sum_{i=1}^{N} x_i^2 - 2\bar{x}^2 + \bar{x}^2. \quad \text{(EQ. 32)}$$

Simplifying, $$\sigma_x^2 = \frac{1}{N} \sum_{i=1}^{N} x_i^2 - \bar{x}^2. \quad \text{(EQ. 33)}$$

Writing everything in terms of summations provides:

$$\sigma_x^2 = \frac{1}{N} \sum_{i=1}^{N} x_i^2 - \left(\frac{1}{N} \sum_{i=1}^{N} x_i\right)^2. \quad \text{(EQ. 34)}$$

Therefore, the minimal sufficient statistics used to compute the K-factor are:

$$\sum_{i=1}^{N} x_i, \sum_{i=1}^{N} x_i^2. \quad \text{(EQ. 35)}$$

These are the only two values that are required in order to determine the K-factor. Accordingly, the real time algorithm only requires that these two values be calculated and saved. It is therefore unnecessary to save each individual tone or the tone's power value. This avoids wasting memory as a result of buffering the tones.

The use of simple minimal sufficient statistics enables an iterative real-time algorithm to be used which eliminates storage issues. In view of memory limitations on the DSP chips commonly used in wireless devices, this is a significant advantage. We can obtain the K-factor during a window of time by keeping track of the sum and sum of the squares of the individual power gains, and by having a counter of the samples arrived.

Accordingly, if using the minimal sufficient statistics criterion established above there is one major issue to analyze, namely, what is a minimum or reasonably minimum number of samples (N) needed to obtain a good estimation of the K-factor? "Good" is defined herein to mean an estimation within an acceptable margin of error, (i. e., +-10%) and one which does not require an excessive amount of computing time. A number of simulations were made where the "window size" (N) was varied. It was found that window sizes of 2,000–10,000, with each sample arriving every 3 ms, provide good simulation results. Experimentation has demonstrated that a window size of 2,000 samples gives reasonably good results in conjunction with an acceptable computing time (it updates the K-factor every 6 seconds). The larger the window size selected, the longer the computing time to determine the final value.

Whenever estimators are used, there exists the possibility of introducing excessive fluctuations in the estimated values. In order to minimize such fluctuations, filters can be utilized to smooth the estimated values. In the exemplary embodiment, IIR low pass filters (first order) are employed to smooth some of the estimated variables.

The form of a first-order low pass IIR filter is:

$$y[n]=\alpha y[n-1]+(1-\alpha)x[n] \quad \text{(EQ. 36)},$$

where:

x[n] is the input sample at time n;

y[n] is the output sample at time n; and

α is a forgetting factor.

This type of IIR filter is simple and requires a minimum amount of memory. Although the effectiveness of the filter can be enhanced by increasing the order of the filter, the computational complexity, memory requirements, and computing time comensurately increases. In the exemplary algorithm, two basic estimators are employed: the average of the power gains and the average of the power gains squared. Accordingly, it is preferred to to filter the output of these two estimators using the IIR filter defined in EQ. 36. The same methodology can be used to smooth the estimation of the K-factor as well.

The simplest solution to the problem of estimating $G_a$ and $G_v$ is to record a certain number of amplitude samples from the channel and subsequently, off-line, computing the K-factor using EQ. 2. This is the common way in which the moment-based method has been implemented. The problem with this methodology is that it does not occur in real-time, i.e, because the moment estimation is not made on-line, changes in the settings of a wireless system can not be made "on the fly". Thus, the K-factor is first computed off-line, and then the information is used to make the requisite changes in the wireless system. Ideally, the present invention enables the K-factor determination to be made on-line such that fast and automatic decisions can be made.

Another possible solution involves recording a certain number of amplitude samples from the channel on-line (on the DSP chip), and then computing the K-factor on-line using EQ. 2. In terms of automatization this method is advantageous over the first method described above. However, it creates an additional problem, namely, that of data storage. This problem is evident with the type of DSP chips commonly used in wireless devices because they typically have a very limited on-board memory. Accordingly, it is desirable to minimize the amount of buffering (storing of data) on the DSP chip.

Due to the constraints and problems of the two approaches above, the present invention utilizes an improved methodology for estimating the requisite parameters. In the preferred embodiment, the minimum sufficient statistics of the channel are modelled utilizing EQ. 1. This type of estimation solves two primary problems: it is implementable in real-time, and it requires minimum buffering. Accordingly, for a fixed period of time (i.e., for a window of amplitude samples) only two values need to be stored: the sum of the power gain samples, and the sum of the power gain samples squared. More detail on this approach is described below.

The statistical nature of these computations unfortunately implies imperfect knowledge of our parameters. Thus, wild variations in an otherwise smooth measured signal will show up. Since these fluctuations can affect the accuracy of the calculations, a method of preventing such deviations is necessary. The present invention therefore employs first-order low-pass filtering to provide the requisite smoothing to keep our estimates within a margin of error of +−10%.

One other consideration in the design of the system resides in the format in which incoming data is processed. If the K-factor is computed for every incoming datum, many operations would have to be executed in a short period of time. On the other hand, we can have extremely fast updates in the K-factor (in the range of milliseconds). Such a high speed is not necessary and it can be a waste of computational resources. An update rate of once every few seconds is more appropriate and reliable. Accordingly, in the present invention it is preferred to compute the K-factor after processing a window of amplitude samples. For the duration of the window, the only values being updated are the sums of the power gains and the power gains squared. The computation of the square root and the division in EQ. 2 occurs only once at the end of each window. This approach saves time and computing power, since calculations of square roots and divisions are expensive operations in DSPs. As described above, illustrative window size is 2000 samples. In this example, the K-factor is calculated after processing the sums of the power gains and power gains squared of 2000 incoming amplitudes. In an exemplary fixed wireless application, if the amplitude is sampled every 3 ms, the K-factor will be updated approximately every 6 seconds. Different window sizes can be selected depending upon how fast it is desired to obtain an updated K-factor and the available computational resources.

Figure 2:
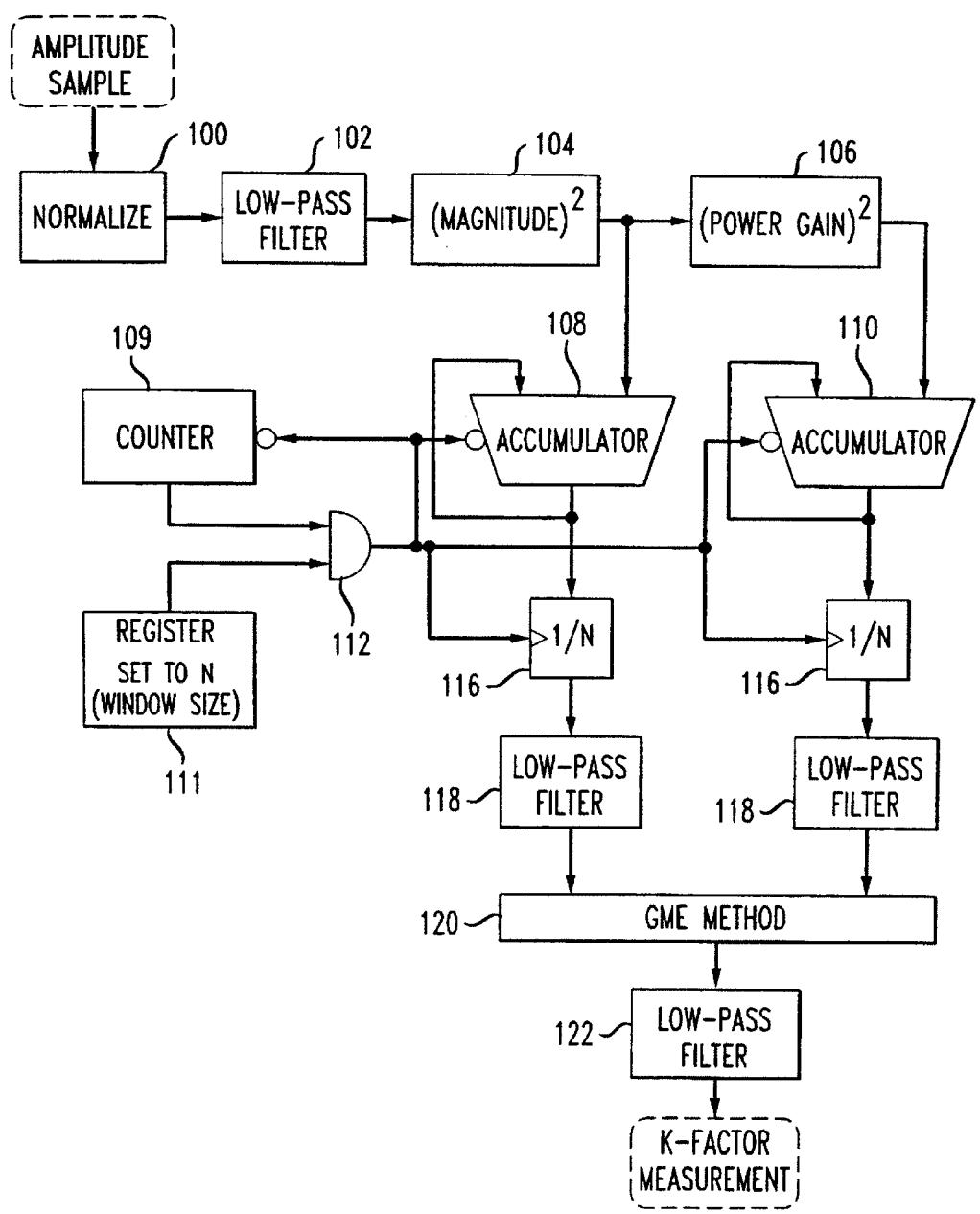
FIG. 2 is a hardware schematic of the present invention.
Figure 3:
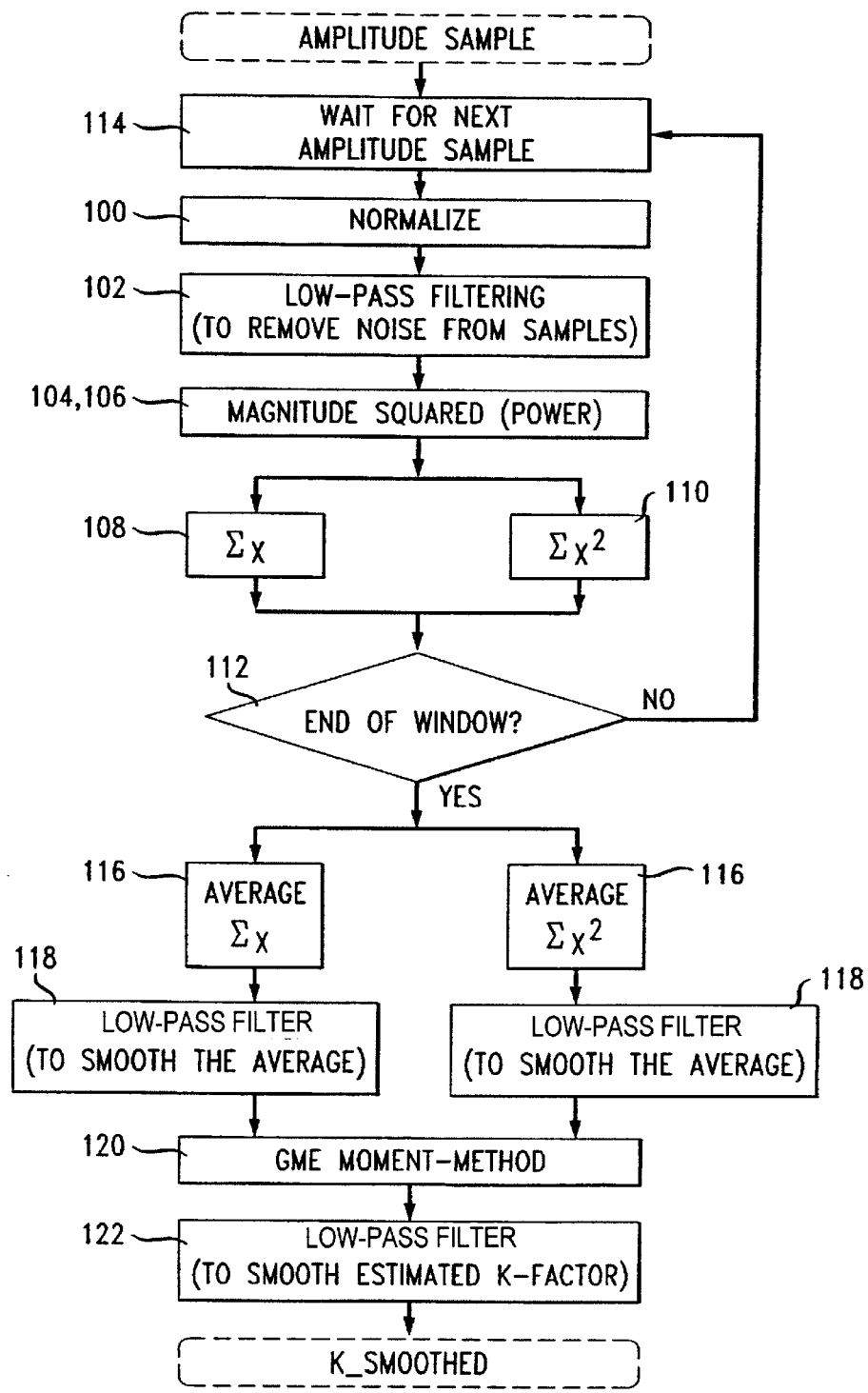
FIG. 3 is a flow-chart diagram of a method for measuring the Ricean K-factor in accordance with the present invention.

Referring now to FIGS. 2 and 3, there is depicted a hardware diagram of the system, and a functional diagram of the methodology, respectively. In some instances, an RF waveform of fixed amplitude is communicated from the transmitter 12. In other instances, an RF waveform of varying amplitudes is transmitted. In the latter case, the waveform is normalized to remove variations present in the signal. This normalization does not remove the received amplitude variation due to the channel. If waveforms of fixed amplitude are transmitted, this normalization procedure is unnecessary. In the illustrative process, an RF waveform of varying amplitude is normalized at 100.

The normalized incoming amplitude sample is then low-pass filtered at 102 to eliminate potential high frequency noise in the sample. The cutoff frequency of the filter must be higher than the Doppler frequency of the fading profile. If the noise level is low enough, it is possible to to obtain good performance without this initial filtering procedure.

After the signal is filtered at 102, the power gain is determined by computing the magnitude squared of the filtered sample amplitude at 104. The square of the power gain is then computed at 106.

Next, the sum (Σx) of the power gains, x, and the sum of the squares of the power gains (Σx²) is updated in respective accumulators at 108 and 110 respectively. These are the minimal sufficient statistics previously discussed. As shown in FIG. 2, the sums and counter 109 are reset to zero at the end of each mesurement window. The measurement window is set to N, the sample size, i.e., 2000, in register 111.

At 112, the system checks the number of times that the sums of the power gains (Σx) and squares of the power gains (Σx²) have been modified. If this number is equal to the selected window size N, then the end of the window has been reached, and the process proceeds to the final steps to calculate the K-factor. If the window N has not yet been reached, the system waits until the next amplitude sample arrives at 114 (while at the same time storing the values of the updated sums in accumulators 108, 110).

When the summation window expires, the sum of the power gains (Σx) and the sum of the squares of the power gains (Σx²) is final averaged at 116 by dividing these values by the sample size N. With these averages, an estimate is made of the first and second moments of the window of samples just processed.

These averages are then low-pass filtered at 118 to avoid wild fluctuations using, in the illustrative embodiment, first order low-pass IIR filters. These filtered values are then utilized as inputs to the moment-based set of Greenstein-Michelson-Erceg (GME) equations at 120, i.e., using EQ.2 and the following auxiliary equations:

$$\hat{G}_a = \frac{1}{N}\sum_{i=1}^{N} x_i \qquad \text{(EQ. 37)}$$

And, $$\hat{G}_v = \frac{1}{N}\sum_{i=1}^{N} x_i^2 - \hat{G}_a^2 \qquad \text{(EQ. 38)}$$

Here, EQ. 37 and EQ. 38 represent the estimates of $G_a$ and $G_v$, respectively, where N is the size of the window of samples defined above. These estimates are then inserted into EQ.2 to obtain the estimate of the K-factor of the channel for the given sample window. The resultant K-factor can be passed through a low-pass IIR filter at 122 to further smooth it.

The order in which the filtering process is applied is important. In one expedient, the low pass filtering can be implemented only after computation of the K-factor. However, this approach requires the use of higher order filters, thereby creating additional complexity, more computations, and likely buffering of some samples. In the preferred embodiment, filtering the averages (or the sums) bounds the inputs to the GME equation, thereby bounding the computed K-factor. Additionally, after calculating the K-factor using the GME equations, in the preferred embodiment further filtering is applied to remove noise in the estimated K-factor. This implementation advantageously reduces the margin of fluctuations in the estimation of the K-factor; avoids system overflows (by bounding the averages); reduces data buffering requirements; reduces the quantity of operations per filter (atttributable to the order of the filters); and provides quick convergence of the reported K-factor to the actual value.

The present invention has been shown and described in what is considered to be the most preferred and practical embodiment. It is anticipated, however, that departures may be made therefrom, and that obvious modifications will be implemented by those skilled in the art.

We claim:

1. A computer-implemented method for measuring a Ricean K-factor of a wireless channel in real-time, comprising the steps of:

(a) obtaining an incoming amplitude sample;

(b) computing a magnitude squared of the incoming amplitude sample to obtain a power gain and computing a magnitude squared of the power gain;

(c) calculating a sum of the power gain and a sum of the magnitude squared of the power gain for a incoming window of amplitude samples;

(d) final averaging the sums of the window of amplitude samples to estimate the first and second moments of the window of incoming amplitude samples;

(e) inputting the final average to obtain estimates for the time average of the power gain Ga and rms deviation of the power gain Gv about Ga:

$$\hat{G}_a = \frac{1}{N}\sum_{i=1}^{N} x_i$$

and, $$\hat{G}_v = \frac{1}{N}\sum_{i=1}^{N} x_i^2 - \hat{G}_a^2; \text{ and}$$

(f) computing the K-factor in accordance with:

$$K = \frac{\sqrt{G_a^2 - G_v^2}}{G_a - \sqrt{G_a^2 - G_v^2}}.$$

2. The method for measuring the Ricean K-factor of a wireless channel in real-time recited in claim 1, further comprising the step of normalizing the incoming amplitude sample.

3. The method for measuring the Ricean K-factor of a wireless channel in real-time recited in claim 1, further comprising the steps of low pass filtering the amplitude sample prior to obtaining the power gain and computing the magnitude squared of the power gain, and low-pass filtering the estimates of first and second moments of the window of samples.

4. The method for measuring the Ricean K-factor of a wireless channel in real-time recited in claim 1, further comprising the step of low-pass filtering the computed K-factor.

5. The method for measuring the Ricean K-factor of a wireless channel in real-time recited in claim 1, wherein the window of samples ranges from 2000–10,000.

6. A method for measuring a Ricean K-factor of a wireless channel in real-time, comprising the steps of:

(a) normalizing an incoming amplitude sample;

(b) low-pass filtering the amplitude sample; (c) computing a magnitude squared of the incoming amplitude sample to obtain a power gain and computing a magnitude squared of the power gain;

(d) calculating a sum of the power gain and a sum of the magnitude squared of the power gain for a window of incoming amplitude samples;

(e) final averaging the sums of the window incoming of amplitude samples to estimate a first moment and a second moment of the window incoming of amplitude samples;

(f) low-pass filtering the averages of the sums of the window incoming of amplitude samples;

(g) inputting the final average to obtain estimates for a time average of the power gain $G_a$ and an rms deviation of the power gain $G_v$ about $G_a$:

$$\hat{G}_a = \frac{1}{N}\sum_{i=1}^{N} x_i$$

and $$\hat{G}_v = \frac{1}{N}\sum_{i=1}^{N} x_i^2 - \hat{G}_a^2;$$

(h) computing the K-factor in accordance with:

$$K = \frac{\sqrt{G_a^2 - G_v^2}}{G_a - \sqrt{G_a^2 - G_v^2}}; \text{ and}$$

(i) low-pass filtering the computed K-factor.

* * * * *